April 5, 1932.    F. C. MITCHELL    1,852,360
FRICTION DRIVE TRANSMISSION
Filed Oct. 10, 1930    3 Sheets-Sheet 2

INVENTOR
F. C. Mitchell
BY
ATTORNEY

April 5, 1932.  F. C. MITCHELL  1,852,360
FRICTION DRIVE TRANSMISSION
Filed Oct. 10, 1930   3 Sheets-Sheet 3

INVENTOR
F. C. Mitchell
BY
ATTORNEY

Patented Apr. 5, 1932

1,852,360

UNITED STATES PATENT OFFICE

FLOYD C. MITCHELL, OF STOCKTON, CALIFORNIA, ASSIGNOR TO SUNSET MOTOR COMPANY, OF SACRAMENTO, CALIFORNIA, A CORPORATION OF NEVADA

FRICTION DRIVE TRANSMISSION

Application filed October 10, 1930. Serial No. 487,732.

This invention relates to power transmitting devices of the friction drive type as differentiated from one utilizing gears; and particularly relates to transmissions of the general form disclosed in the L. W. Davis Patents, Nos. 1,107,412 dated August 18, 1914; 1,241,609 dated October 2, 1917; 1,334,-439 dated March 23, 1920; and 1,633,316 dated June 21, 1927. The present invention also particularly deals with the reversing of the driven cones relative to the driving cones and in this respect represents improvements over the structures shown in the above mentioned patents, though having some points in common with the structure of Patent No. 1,107,-412.

In the general arrangement of the structure of the invention a pair of opposed driving cones are used, fixed on a common drive shaft and arranged to engage oppositely facing driven cones arranged between the driving cones. Since the driven cones are connected to a common axle or the like they must both rotate in the same direction and therefore one of such cones must engage one of the driving cones only on one side, while the other driven cone engages the other driving cone only on the opposite side. To reverse the direction of rotation of the driven cones their points of contact with the driving cones must be reversed, as will be obvious. In the last mentioned patent this was done by mounting the shafts of the driven cones in eccentric bearings, themselves turnably mounted in bearings on the framework of the transmission, which eccentric bearings were located by a suitable hand actuated lever and linkage mechanism. This arrangement however while enabling the cones to be shifted in a plane at right angles to the drive shaft, so that a full contact with the driving cones was always made, either provided to limit a range of shifting movement, or else caused the center to center distance between the cone shafts and the axle to be altered. Since these shafts are connected to each other by chain or gear drives, this relative altering of the center to center distance resulted in poor working of the gears or chains. In the other patents the cone reversing arrangement was such that the cones did not engage each other evenly for the full width of their faces and a break-down of the cones soon resulted.

It is therefore the main object of the present invention to provide a reverse arrangement for the driven cones of such a nature that said cones will move in a plane parallel to the drive shaft, while at the same time the shafts on which the driven cones are mounted will always remain at a constant center to center distance from the axle to which said shafts are operatively connected.

The objectionable features and defects inherent in the previous constructions are therefore eliminated.

I have also provided a manually operated mechanism for thus shifting or reversing the cones so that the engaging pressures of the driven cones with the driving cones will be equalized, regardless of any inequalities in wear and consequent difference in size of the opposed cones.

These objects I accomplish by means of such structure and relative arrangement of parts as will fully appear by a perusal of the following specification and claims.

In the drawings similar characters of reference indicate corresponding parts in the several views.

Figure 3:
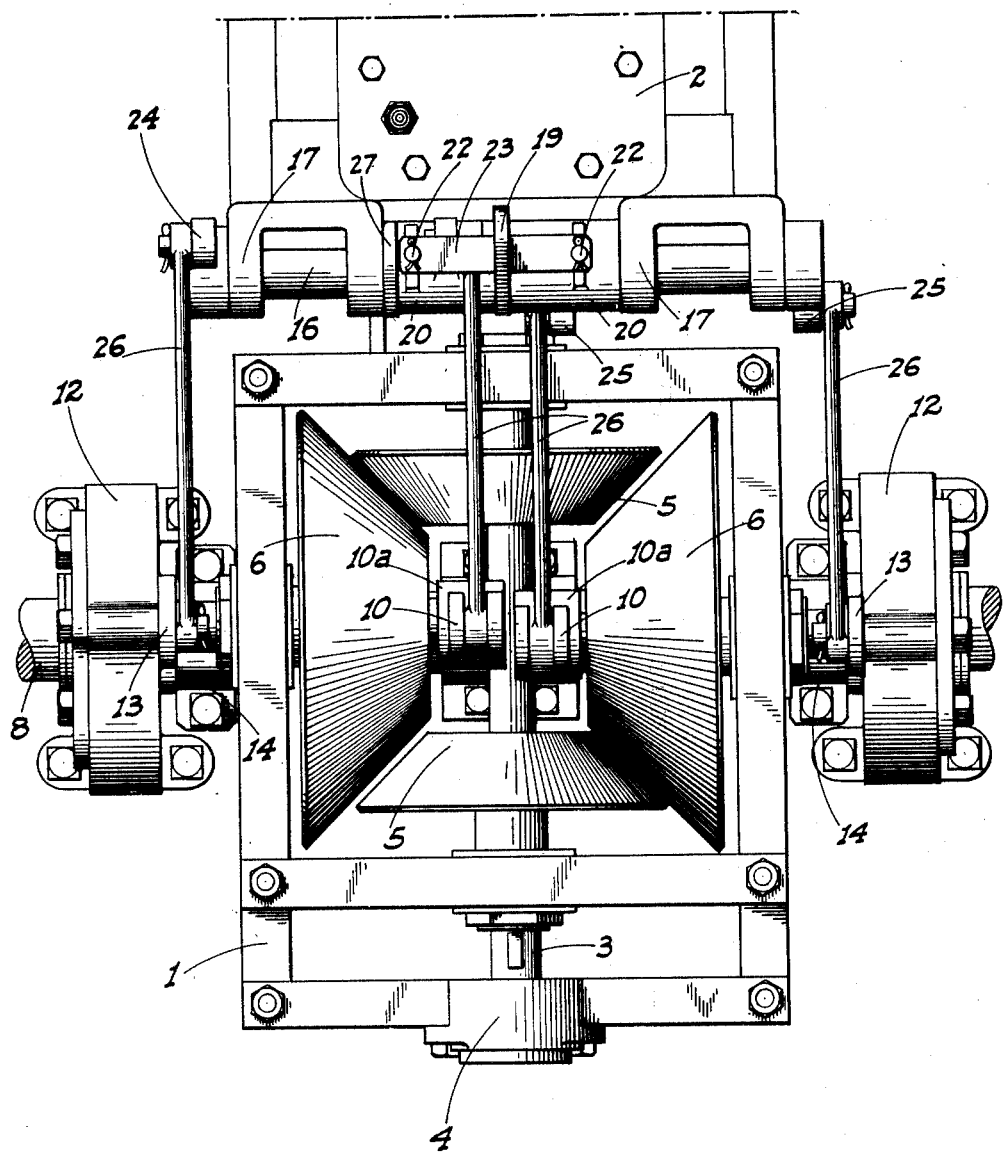
Fig. 3 is a top plan view of the same.

Referring now more particularly to the characters of reference on the drawings, the numeral 1 denotes suitably spaced side frames which form the support for the transmission and preferably but not necessarily for a power plant such as a gas engine 2. Extending lengthwise of and above the plane of the frames is a drive shaft 3, which in a closely coupled arrangement, is a direct extension of the engine shaft, and apart from the engine journals is only supported at its end opposite the engine in a bearing 4 mounted on a cross beam 1a secured to the frames 1. Splined or slidably keyed on the shaft are opposed driving cones 5 arranged in facing relation to each other. Projecting between these cones are the driven cones 6 also arranged in facing relation to each other. These driven cones are splined or slidably keyed on separate shafts 7 arranged in a horizontal plane at right angles to the plane of the shaft 3, but normally out of longitudinal alinement with each other, although parallel as shown in Fig. 3. Therefore since the cones 6 are the same size one of such cones will engage one of the cones 5 only, while the other cone 6 will engage the other cone 5 only and in reversed or opposed order. Both cones 6 will therefore rotate in the same direction. Shifting of the shafts 7 horizontally in a plane transversely of their length and in opposite directions simultaneously, will reverse the engagement of the cones 6 with the cones 5 and the mechanism for accomplishing this result forms the main feature of the present invention, as will now be described.

Figure 1:
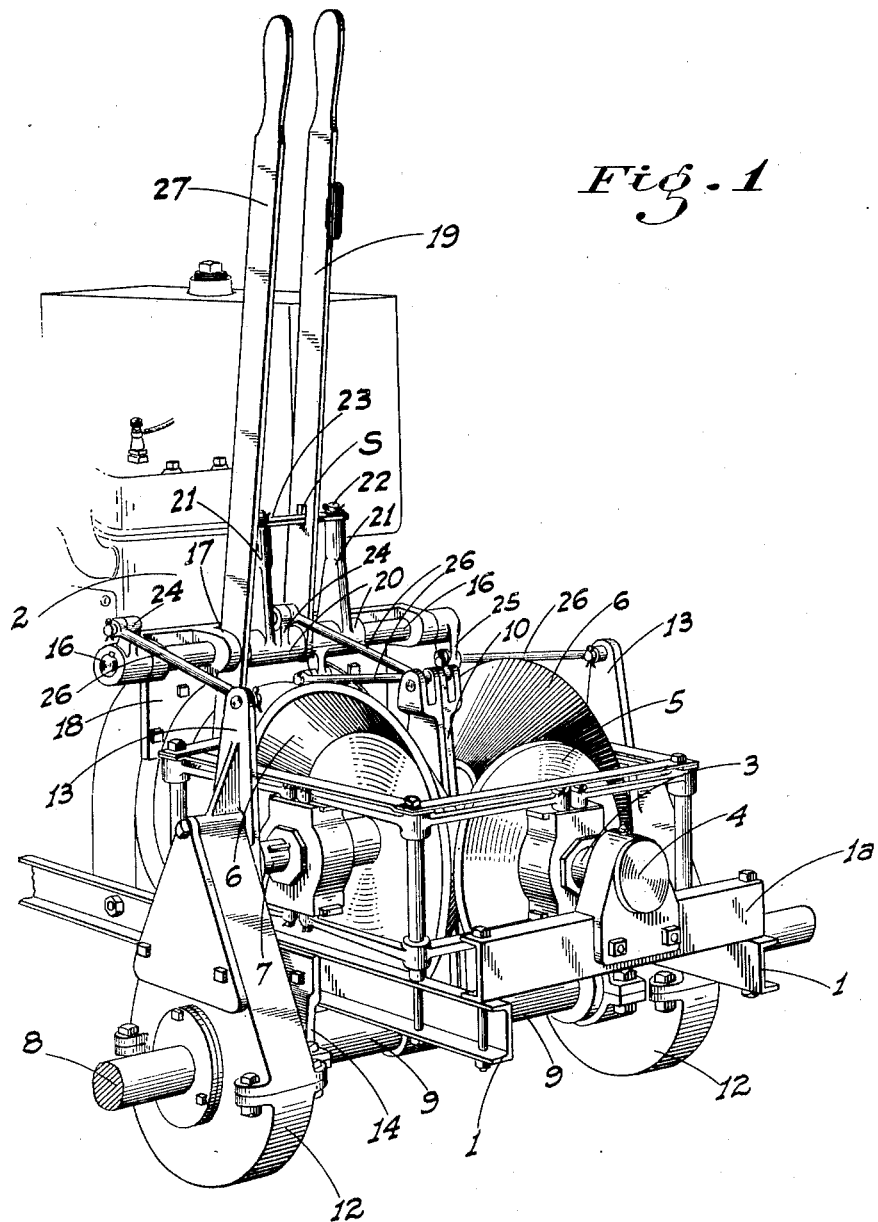
Fig. 1 is a perspective view of my improved transmission structure as arranged in unitary association with a power plant.
Figure 2:
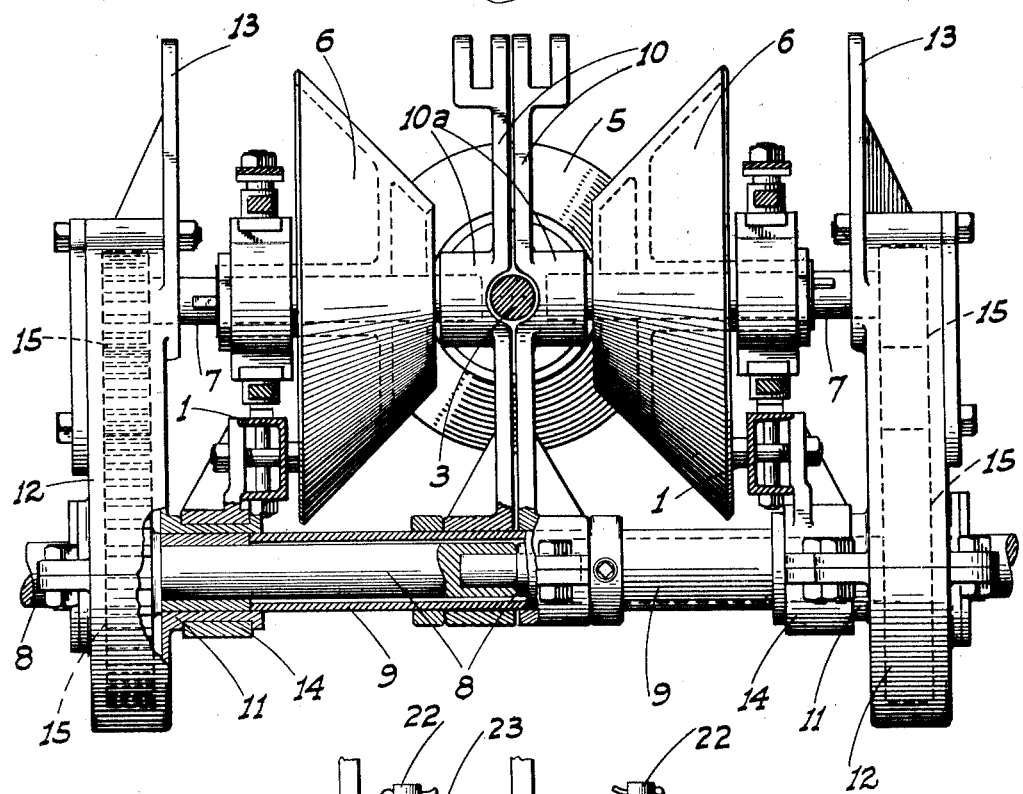
Fig. 2 is an enlarged transverse section of the structure.
Figure 4:
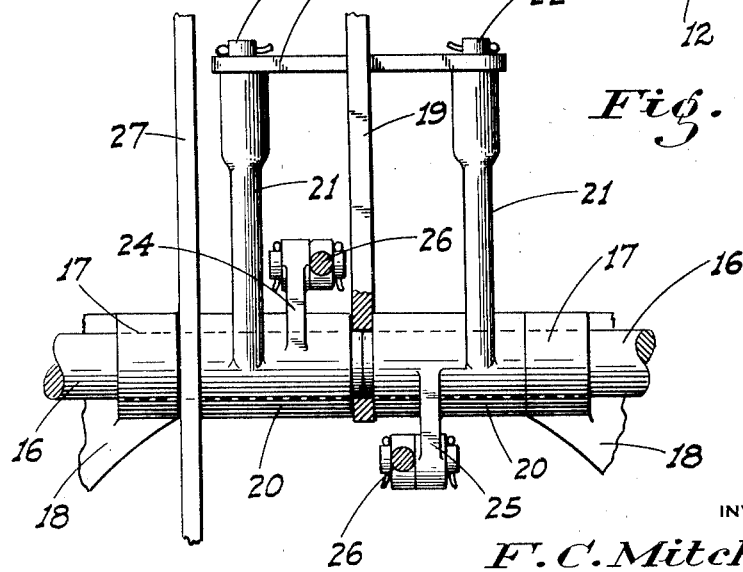
Fig. 4 is an enlarged fragmentary view of the manually actuated shifting apparatus, showing the pressure equalizing mechanism thereof.

Disposed directly under the frames 1 parallel to the shafts 7 is an axle 8 or the like, on the outer end of which wheels are adapted to be mounted. In certain cases, this axle may be a one-piece member, but for tractor and other service, it is preferably formed of two separate independently turnable parts, as shown. A sleeve 9 surrounds the axle under the transmission structure. Intermediate its ends, the sleeve is engaged by the lower ends of separate vertical arms 10, which extend upwardly past the shaft 3 in surrounding but non-engaging relationship therewith, as shown in Fig. 2, and are formed intermediate their ends with bearing bosses or housings 10a for the adjacent ends of the shafts 7. At its outer end said sleeve 9 projects into the hubs 11 of gear boxes 12, which also in effect constitute arms and which project upwardly and are provided at their upper ends with bearings for the outer ends of the corresponding shafts 7. Extension arms 13 are rigid with and project upwardly from the housings or gear boxes 12 to a height equal to that of the arms 10. Bearing members 14 secured to and depending from the frames 1 engage the hubs 11 of the housings and thus pivotally support said housings; the axle members being journaled in the hubs 11. Trains of gearing or the like indicated at 15 and enclosed in the housings 12 operatively connect the shafts 7 and the axle in driving relation, and it will be seen that the distance between the centers of said shafts and the axle always remains constant irrespective of the rocking of the housings.

It will also be seen that with such rocking the shafts 7 are maintained in a plane at right angles to the shaft 3.

Simultaneous shifting movement is imparted to the shafts 7 in opposite directions by the following means: Disposed beyond one end of the transmission in transversely alined relation therewith are a pair of longitudinally alined shafts 16, preferably on a level with the upper ends of the arms 10 and 13. These shafts are journaled in bearings 17 having bracket plates 18 by means of which they may be mounted in a fixed position. In the present instance these plates are shown as being mounted on the flywheel housing of the engine, but this is a matter of convenience and depends on the location desired for the operating lever 19. This lever is turnably mounted on the shafts 16 at their adjacent ends and projects upwardly to a convenient height. Fixed on said shafts to the side of the lever are sleeves 20 from which posts 21, parallel to the lever, project upwardly. Turnable on vertical pins 22 upstanding from the posts is a bar 23 extending between the pins and passing freely through a slot S in the lever. From one sleeve and from the corresponding shaft beyond the same short arms 24 project upwardly, while from the other sleeve and from the corresponding shaft other arms 25 of the same length depend. These pairs of arms are longitudinally alined with the pairs of arms 10 and 13 and are connected thereto by rigid pivoted links 26. It will thus be seen that by this arrangement a movement of the lever will impart a movement in the same direction to both shafts 16. On account of the pairs of arms 24 and 25 extending in opposite directions radially of the shaft however, one pair of arms 10 and 13 and the corresponding shaft 7 will be moved in one direction, and the other pair of arms and the corresponding shaft 7 will be moved in the opposite direction.

It will also be seen by reason of the equalizing bar 23 that if one cone 6 should engage its cone 5 before the other cone 6 engages its cone 5, a movement will still be imparted to the control mechanism of said other cone by a continued movement of the lever, so that the final engaging pressure of the cooperating cones will be equal. Since this apparatus is a change speed transmission, as well as a forward and reverse speed arrangement, means is provided to slide the pairs of cones relative to each other in opposite directions, so as to alter their relative diameters as far as their areas of contact at any one time is concerned. This is accomplished by the same structure used in the previous patents, as shown in the drawings, and controlled by a lever 27 preferably mounted in connection with the shafts 16 but of course having no connection therewith. Since this arrangement however forms no part of the present invention a description of the same is deemed unnecessary.

It is to be noted that the equalizer structure is not necessary or even desirable in certain cases, (as in tractor service for quick turning of the tractor); and the rotation of the shafts 16 would then be separately controlled.

From the foregoing description it will be readily seen that I have produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a friction drive structure having oppositely arranged and cooperating pairs of drive and driven friction members, separate shafts on which said driven members are mounted, a wheel-supporting axle unit parallel to said shafts mounted in fixed vertically spaced relation thereto, a pair of spaced arm members for each shaft turnably mounted on the axle unit, bearings for the shafts in the corresponding arms, drive connections between each shaft and the axle unit, and means applied to the arms for rocking the same simultaneously about the axle unit but in opposite directions.

2. In a friction drive structure having oppositely arranged and cooperating pairs of drive and driven friction members, separate shafts on which said driven members are mounted, a wheel-supporting axle unit parallel to said shafts mounted in fixed and spaced relation thereto, a pair of spaced arm members for each shaft turnably mounted on the axle unit, bearings for the shafts in the corresponding arms, one of each pair of arms being formed as a housing surrounding the axle unit and corresponding shaft, drive connections between the shafts and axle unit enclosed within the corresponding housing, and means for rocking the arms simultaneously but in opposite directions about the axle unit as an axis.

3. In a friction drive structure having oppositely arranged and cooperating pairs of drive and driven friction members, separate shafts on which said driven members are mounted, and vertical rocking arms on which said shafts are supported; a means for rocking the arms of the separate shafts simultaneously but in opposite directions and with equalized pressure comprising separate shafts parallel to said first named shafts and spaced horizontally from the arms, posts fixed in connection with said separate shafts in parallel relation radially thereof, a cross-bar between the outer ends of the posts and pivotally mounted thereon, a lever turnably mounted axially of said separate shafts between the posts, said lever having a slot through which the bar freely projects, and connecting instrumentalities between the separate shafts and the separate shaft supporting arms for rocking the latter in opposite directions with a rotation of said separate shafts in a common direction.

In testimony whereof I affix my signature.

FLOYD C. MITCHELL.